United States Patent Office 3,002,996
Patented Oct. 3, 1961

3,002,996
PROCESS FOR THE PREPARATION OF DRY OXIMES
Gerhard Meier and Arndt Striegler, Leuna, Germany, assignors to VEB Leuna-Werke "Walter Ulbricht," Leuna, Germany
No Drawing. Filed July 10, 1956, Ser. No. 596,831
9 Claims. (Cl. 260—566)

This invention relates to oximes and more particularly to a process for the preperation of dry and pure oximes from water-containing, crude oximes.

It is an object of this invention to provide a simple process for the preparation of dry and pure oximes from water-containing, crude oximes which is easily carried out and which yields pure oximes which for example may be converted by the Beckmann-rearrangement into acid amides or lactams of very good quality and in high yield with less fuming sulfuric acid than is customarily required for such rearrangement of water-containing oximes.

A further object of this invention is the provision of a process for the drying of water- and ketone-containing oximes in which the ketone liberated during the drying procedure may be recovered and used for the formation of oximes.

Still a further object of the invention is the provision of a process for the purpose referred to in which no losses of oxime are incurred and in which small amounts of oxime which possibly may escape during the drying procedure are recovered.

Finally, it is an object of this invention generally to improve on processes for the drying of moist oximes as now customarily practised.

Other objects of the inventive process will become apparent from the following description.

Oximes which are difficultly soluble in water, such as for example cyclohexanone oxime, methyl-cyclohexanone oximes and the like oximes, may be prepared on a technical scale by reacting the corresponding ketones with a hydroxylamine sulfate solution which latter contains sulfuric acid and ammonium sulfate. Such hydroxylamine sulfate solution containing sulfuric acid and ammonium sulfate is obtained if it is prepared according to the process of Raschig. For the purpose of completing the conversion into oxime the sulfuric acid containing solution is for example neutralized with ammonia. Owing to the temperature increase occurring during such neutralization, the oximes separate in molten state on the hot ammonium sulfate liquor. The molten oximes obtained after separation contain about 4–6% of water and about 0.5–0.8% of the ketone originally used.

Now, it is known that oximes which are devoid of water and ketone yield—after the Beckmann rearrangement with fuming sulfuric acid—acid amides or lactams of better quality and in higher yields than oximes which contain water and ketone. Moreover, oximes devoid of water require considerably less fuming sulfuric acid or sulfuric acid proper for the Beckmann rearrangement, than water-containing oximes.

In accordance with this invention crude oximes, that is, oximes containing water and ketone, are dried by subjecting them to a blowing-out treatment with gases, such as for example nitrogen or air, at elevated temperature. The dried oximes obtained after such treatment yield acid amides or lactams of excellent quality in a high yield and in a particularly economic manner.

For the purpose of thus treating the molten, crude oximes, they may be placed into a relatively wide tube which is heated along its entire length, whereafter the heated gases are conducted through the melt in fine distribution. Both the supply of the crude oximes and the discharge of the dried oximes, which then are devoid of ketone, may be performed batchwise or continuously.

The gases passing through the tube and thus through the melt take up at the elevated temperature the vapors and steam of the ketone and water contained in the oxime. The period of the duration of stay of the oximes within the tube may be easily adjusted in such a manner that oximes entirely devoid of water and ketone are obtained. The escaping gases and vapors may be cooled in a cooler whereby the vapors are condensed to form water and ketone. A small amount of oxime proper usually escapes with the gases and vapors and this separates then in the cooler. In most cases this oxime separates in the cooler in crystalline form. This crystalline oxime may cause clogging of the cooler.

According to a further feature of the invention, the cooling of the gases and vapors is effected with hydroxylamine sulfate solution. This hydroxylamine sulfate solution may afterwards be used advantageously for the oxime formation of ketones as previously referred to. In case such hydroxylamine sulfate solution is employed for the cooling, the ketone contained in the vapors is absorbed by the hydroxylamine sulfate solution and immediately converted into oxime. Further, no oxime crystals, as previously referred to, are formed since the condensing oxime dissolves in the solution. After having been used as cooling agent for the gases and vapors, the thus enriched hydroxylamine sulfate solution may be conveyod to a plant for oxime formation. It will thus be realized that the employment of hydroxylamine sulfate solution as cooling agent for the gases and vapors is particularly advantageous.

The process of the invention will now be described by several examples, but it should be understood that these examples are given by way of illustration rather than by way of limitation, and that many variations may be made in for example amounts, temperature, choice of starting material and process conditions in general, without departing in any way from the spirit and scope of this invention.

*Example 1*

The process to be described was carried out in a relatively wide tube surrounded by a water jacket. The water in the jacket was kept at a temperature of about 100° C. A cooler was arranged at the discharge end of the tube. 1000 parts by weight of an o-methylcyclohexanone oxime containing 5% of water and 0.8% of o-methylcyclohexanone were inserted into the tube. Nitrogen was then passed through the tube at a rate of about one hundred times the volume of the o-methylcyclohexanone oxime per hour. After 30 minutes the oxime in the tube contained 3.3% of water. After 90 minutes the water content of the oxime had been reduced to 1.2%. The supply of nitrogen was interrupted after 3 hours when the oxime in the tube contained but 0.2% of water and was entirely devoid of ketone. The escaping nitrogen gas and the vapors were passed through the cooler. 45 parts of an aqueous layer and 3 parts of an oily layer condensed and separated in the cooler. The aqueous layer contained o-methylcyclohexanone and its oxime in dissolved form, while the oily layer was preponderantly comprised of oxime.

The dried oxime obtained in the tube yielded after the Beckmann rearrangement with fuming sulfuric acid a methyllactam of excellent quality in a yield of 95%. The amount of fuming sulfuric acid required for the rearrangement was about 10% less than that required for the rearrangement of moist oxime.

*Example 2*

The process to be described was carried out in a relatively wide tube provided with outside heating by means of which the tube was heated to a temperature of 100° C. An overflow pipe was arranged at the bottom end of the tube. A trickle tower was arranged at the discharge end of the tube. 1000 parts by weight of a molten cyclohexanone oxime were hourly supplied to the tube from above. The cyclohexanone oxime contained 5.3% of water and 0.7% of cyclohexanone. The oxime left the tube through the overflow pipe. Air which was preheated to a temperature of about 110–120° C. was passed through the tube. The rate of flow of the hot air was about one hundred times the volume of the oxime per hour. For cooling purposes, the air enriched by vapors and steam was thereafter conducted through the trickle tower. A solution of hydroxylamine sulfate was supplied to the trickle tower in counter current to the enriched air. The air escaping from the trickle tower was completely devoid of cyclohexanone and oxime vapors which shows that these had been taken up by the hydroxylamine sulfate solution. The dried oxime discharged through the overflow pipe did not contain cyclohexanone any more and contained only 0.1–0.3% of water. The supply of crude oxime to the tube as well as the withdrawal of the dried oxime from the tube, may thus be carried out continuously.

The dried oxime thus obtained after above described treatment yielded after the Beckmann rearrangement with fuming sulfuric acid a caprolactam of excellant quality in a yield of 95–96% calculated on the amount of the original oxime employed. The amount of fuming sulfuric acid required for the rearrangement was about 10% less than that necessary for the rearrangement of the water-containing starting oxime.

*Example 3*

The process to be described was carried out in a relatively wide tube surrounded by a water jacket. The water in the jacket was kept at a temperature of about 100° C. A cooler was arranged at the discharge end of the tube. 1000 parts by weight of a molten pinacoline oxime containing 4.6% of water and 0.7% of pinacoline were inserted into the tube. Nitrogen was then passed through the tube at a rate of about one hundred times the volume of the oxime per hour. The supply of nitrogen was interrupted after two hours when the oxime in the tube contained but 0.1% of water and was devoid of pinacoline. The escaping nitrogen gas and the vapors were passed through the cooler. 55 parts by weight of an aqueous layer and 18 parts by weight of crystallized oxime separated in the cooler.

The substantially dry oxime obtained in the tube may successfully be employed for various purposes.

It will be realized that gases other than nitrogen or air may be employed, provided that they are inert to the substances involved in the process.

What we claim is:
1. A process for the production of a dry, substantially pure ketoxime which comprises blowing a stream of inert gas through a crude ketoxime melt containing as impurities water and the corresponding keto compound at temperatures not exceeding 120° C., whereby said water and said ketone are taken up in said inert gas, and passing the vapor-enriched gas stream so formed through an aqueous solution of hydroxylamine sulfate whereby water, said ketone and small amounts of said ketoxime are taken up by said aqueous solution, said inert gas being selected from the class consisting of air and nitrogen, and said ketoxime being difficultly soluble in water and being a ketoxime formed from a ketone selected from the class consisting of cyclohexanone, methyl-substituted cyclohexanone and pinacoline.

2. A process according to claim 1 wherein said crude ketoxime melt contains from 4–6% by weight of water and 0.5–0.8% by weight of said ketone as impurities.

3. A process according to claim 1 wherein said gas stream is preheated prior to being passed through said crude ketoxime mixture.

4. A process according to claim 1 wherein said hydroxylamine sulfate solution enriched with water, said ketone and a small amount of ketoxime is used subsequently in the preparation of additional ketoxime.

5. A process for the preparation of dry o-methyl-cyclohexanone oxime, comprising the steps of heating o-methyl-cyclohexanone oxime containing about 5% of water and about 0.8% of o-methylcyclohexanone in a reaction tube to about 100° C., whereby a melt is formed, passing nitrogen through said reaction tube at an hourly rate of about one hundred times the volume of said oxime, whereby dry o-methylcyclohexanone oxime substantially devoid of water and ketone is obtained in said reaction tube and said ketone, said water and a small quantity of said oxime are taken up by said passing nitrogen in vapor form, and cooling said vapor-enriched nitrogen in a cooler comprising an aqueous hydroxylamine sulfate solution, whereby said water, said ketone and said small quantity of oxime are condensed and taken up by said solution.

6. A process for the preparation of dry cyclohexanone oxime, comprising the steps of heating cyclohexanone oxime containing about 5.3% of water and 0.7% of cyclohexanone in a reaction tube to about 100° C. whereby a melt is formed, passing air of a temperature of about 110–120° C. through said reaction tube at an hourly rate of about one hundred times the volume of said oxime, whereby dry cyclohexanone oxime substantially devoid of water and ketone is obtained in said reaction tube and said ketone, said water and a small quantity of said oxime are taken up by said hot passing air in vapor form, and cooling said vapor-enriched hot air in a solution of hydroxylamine sulfate, whereby said water, said ketone and said small quantity of oxime are condensed and taken up by said solution.

7. In a process as claimed in claim 6, wherein said hydroxylamine sulfate solution and said vapor-enriched air are supplied in counter-current.

8. A process for the preparation of dry pinacoline oxime, comprising the steps of heating pinacoline oxime containing about 4.6% of water and about 0.7% of pinacoline in a reaction tube to about 100° C. whereby a melt is formed, passing nitrogen through said reaction tube at an hourly rate of about one hundred times the volume of said oxime, whereby dry pinacoline oxime substantially devoid of water and pinacoline is obtained in said reaction tube and said pinacoline, said water and a small quantity of said oxime are taken up by said passing nitrogen in vapor form, and cooling said vapor-enriched nitrogen in a cooler containing an aqueous hydroxylamine sulfate solution, whereby said water, said pinacoline and said small quantity of oxime are condensed and taken up by said solution.

9. In a process as claimed in claim 1, wherein said dry ketoxime obtained is continuously withdrawn and a fresh quantity of the crude ketoxime mixture containing water and ketone is continuously supplied, whereby said process is carried out continuously.

References Cited in the file of this patent

UNITED STATES PATENTS

| | | |
|---|---|---|
| 2,129,299 | Bichowsky | Sept. 6, 1938 |
| 2,249,177 | Schlack | July 15, 1941 |
| 2,313,026 | Schlack | Mar. 2, 1943 |
| 2,349,562 | Rosenthal | May 23, 1944 |
| 2,702,301 | Von Schickh et al. | Feb. 15, 1955 |
| 2,746,168 | Rickabaugh | May 22, 1956 |
| 2,790,828 | Haimsohn | Apr. 30, 1957 |

FOREIGN PATENTS

| | | |
|---|---|---|
| 151,486 | Australia | May 19, 1953 |

OTHER REFERENCES

Technique of Organic Chem., vol. III (1950), pp. 615–16.